United States Patent
Sakamoto et al.

(10) Patent No.: US 6,229,298 B1
(45) Date of Patent: *May 8, 2001

(54) ROLLING BEARING UNIT WITH ROTATIONAL SPEED DETECTION DEVICE HAVING A TONE WHEEL AND A SENSOR

(75) Inventors: Junshi Sakamoto, Yokohama; Kouichi Morita, Fujisawa; Takamichi Okada; Akihiro Mashio, both of Hannou, all of (JP)

(73) Assignees: NSK Ltd., Tokyo; Shindengen Electric Manufacturing Co., Ltd., Hannou, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,609

(22) Filed: Sep. 19, 1996

Related U.S. Application Data

(63) Continuation of application No. 08/380,189, filed on Jan. 30, 1995, now Pat. No. 5,614,822.

(30) Foreign Application Priority Data

Jan. 28, 1994 (JP) ................................. H6-008477
Jun. 30, 1994 (JP) ................................. H6-149062

(51) Int. Cl.⁷ ............................. G01P 3/488; F16C 4/104
(52) U.S. Cl. ........................................... 324/174; 384/448
(58) Field of Search ................................. 324/174, 173, 324/207.25; 384/446, 448; 310/155, 168

(56) References Cited

U.S. PATENT DOCUMENTS

| | | | |
|---|---|---|---|
| 3,500,091 | * 3/1970 | Jones | 324/174 X |
| 4,215,286 | * 7/1980 | Ornee | 310/155 |
| 4,461,994 | * 7/1984 | MacDonald | 324/174 |
| 4,636,674 | * 1/1987 | Peterson | 310/155 |
| 4,795,278 | * 1/1989 | Hayashi | 324/174 X |
| 4,841,243 | * 6/1989 | Bishop et al. | 324/174 |
| 4,937,522 | * 6/1990 | Gee | 324/174 |
| 5,023,546 | * 6/1991 | Pawlak et al. | 324/174 |
| 5,023,547 | * 6/1991 | Pawlak et al. | 324/174 |
| 5,140,261 | * 8/1992 | Seo et al. | 324/173 |
| 5,200,697 | * 4/1993 | Adler et al. | 324/207.22 X |
| 5,236,518 | * 8/1993 | Shivai et al. | 148/122 |
| 5,296,805 | * 3/1994 | Clark et al. | 324/174 |
| 5,510,708 | 4/1996 | Shirai et al. . | |

FOREIGN PATENT DOCUMENTS

H6-2237   1/1994   (JP) .

* cited by examiner

Primary Examiner—Walter Snow
(74) Attorney, Agent, or Firm—Evenson, McKeown, Edwards & Lenahan, P.L.L.C.

(57) ABSTRACT

A rolling bearing unit has a rotational speed detection device which is comprised of a sensor having a yoke, a pair of permanent magnets and coil, and a tone wheal which is made by press-forming a magnetic metal plate so as to comprise a cylindrical support base secured onto an end portion of the bearing unit, a ring-shaped first detecting part which is bent radially outward from the inner rim of the cylindrical support base, and a cylindrical shaped second detecting part which extends axially from the outer peripheral rim of the first detecting part the first and second detecting parts having a ferro-magnetic first portion and a non-magnetic second portion, and the yoke having opposite ends to be faced to the first and second portions, and the permanent magnets being faced to each other so that magnetic fluxes flow alternatively through the yoke corresponding the rotation of the tone wheel.

2 Claims, 13 Drawing Sheets

ROLLING BEARING UNIT WITH ROTATIONAL SPEED DETECTION DEVICE HAVING A TONE WHEEL AND A SENSOR

This is a continuation of application Ser. No. 08/380,189, filed Jan. 30, 1995, now U.S. Pat. No. 5,614,822.

FIELD OF THE INVENTION

The present invention is related to a rolling bearing unit with rotational speed detection device which is installed in an anti-lock braking system (ABS) or a traction control system (TCS) so that a vehicle wheel is rotatably supported with reference to a suspension apparatus while the rotational steed of the vehicle wheel is detected.

BACKGROUND OF THE INVENTION

Description of the Related Art

In an automotive vehicle, the wheels must be supported by a suspension apparatus so as to rotate freely. Also, in order to control an anti-lock braking system (ABS) or a traction control system (TCS), the rotational speed of the wheels must be detected. Rolling bearing units having a rotational speed detection device have heretofore been proposed, as disclosed for example in Japanese Utility Model First Publication KOKAI Nos. 3-128856, 5-4021 and in U.S. Pat. No. 5,063,345. A schematic diagram of the rolling bearing unit of U.S. Pat. No. 5,063,345 is shown in FIGS. 1 and 2.

The rolling bearing unit has a tone wheel or pulser ring 1 a part of which is illustrated in FIG. 1 and a stationery or fixed sensor 3 which is mounted on a suspension apparatus. The tone wheel 1 is generally made of a magnetic material and is ford with gear-shaped serrations 2 on an outer peripheral surface thereof. The tone wheel 1 is associated with a vehicle wheel through the bearing unit so as to rotate together with the vehicle wheel. The fixed sensor 3 comprises a permanent magnet 4 which produces an axially aligned (top-bottom direction in FIG. 1) magnetic field, a yoke 5 made of a magnetic material, end a coil 6 wound around the yoke 5.

The yoke 5 has a base end 5a (upper end face in FIG. 1) and a tip end 5b (lower end face in FIG. 1). The base end face 5a of the yoke 5 is abutted against one end face of the permanent magnet 4 (lower end face in FIG. 1 ), while the tip end face 5b of the yoke 5 faces towards the serrations 2. As a result, the magnetic field is formed around the permanent magnet 4 and the yoke 5 as shown by the dotted lines with arrows in FIG. 1.

The density of a magnetic flux producing the magnetic field becomes higher when a protrusion 2a of the serrations 2 is opposed to the tip end face 5b of the yoke 5, and becomes lower when a recess 2b of the serrations 2 is opposed to the tip end face 5b of the yoke 5. The induced electromotive force in the coil 6 thus varies as shown in FIG. 2, in accordance with the variation in magnetic flux density of the magnetic field formed around the coil 6. Since the frequency of the induced electromotive force is proportional to the rotational speed of the vehicle wheel (not shown), then the ABS or the TCS can be appropriately controlled by inputting the induced electromotive force obtained as an output signal from the sensor 3, to a controller 7 of the ABS or the TCS.

With the conventional rolling bearing unit fitted with the rotational speed detection device constructed and operated as mentioned above, there are the following problems.

Namely, in the support section for the rotating wheel, it is not always possible to maintain enough space inside for installation of the sensor 3. It is thus necessary to miniaturize the sensor 3. However mere miniaturization of the sensor 3 causes not only a drop off in output (the difference V in FIG. 2 between the maximum and minimum voltages) of the sensor 3, but also a loss in wheel speed detection reliability.

This is because, in order to miniaturize the sensor 3, it is necessary to make the yoke 5 smaller in size. However, to sufficiently maintain the magnitude (voltage) of the output signal from the sensor 3, a permanent magnet of high magnetic strength or high magnetic flux density must be used for the permanent magnet 4. As a result, there is the likelihood of saturation of the magnetic flux inside the yoke 5. If this occurs, the variation in magnetic flux density between the condition wherein the tip end face 5b of yoke 5 is opposed to a protrusion 2a of the serrations 2 and the condition wherein it is opposed to a recess 2b of the serrations 2 is reduced, so that the output becomes extremely small.

In this respect, a rolling bearing unit fitted with a rotational speed detection device incorporating a sensor which avoids saturation of the magnetia flux inside the yoke while still enabling installation in a limited space, and providing a sufficient output, is disclosed for example in Japanese Utility Model First Publication KOKAI No. 5-4021. A schematic diagram of this bearing unit is shown in FIGS. 3 and 4.

The construction disclosed in this publication has a tone wheel or pulser ring 1 and a permanent magnet 8 which has a magnetic field directed in a radial direction of the tone wheel 1. A projection 9 is provided on an inner peripheral face of the permanent magnet 8 while a yoke 10 made of a magnetic material is provided with a central portion thereof in abutting contact with the outer peripheral face of the permanent magnet 8 and with both end portions 11 turned down.

The projection 9 together with the end portions 11 are arranged so as to be simultaneously faced to protrusions 2a of the serrations 2 on the outer periphery of a tone wheel 1.

A coil 12 which is wound around the yoke 10, comprises a first coil portion 12a and a second coil portion 12b wound in opposite directions to each other and connected together in series.

With such a construction, the magnetic flux from the outer side face of the permanent magnet 8 flows in two separate systems inside the yoke 10 as shown by arrows. Therefore, compared to the structure of FIG. 1, the magnetic flux is less likely to become saturated inside the yoke 10. However there are still problems with obtaining a reliable effect. If the cross-sectional area of the yoke 5 of FIG. 1 is assumed to be the same as that of the yoke 10 of FIGS. 3 and 4, then the structure of FIGS. 3 and 4 can take up to approximately two times the magnet flux density of the structure of FIG. 1. However if a permanent magnet 8 having a magnet flux density in excess of this level is used, the output of the sensor 13 will still drop considerably with saturation of the magnetic flux in the yoke 10.

With the construction of FIGS. 3 and 4, all of the magnet flux utilized in detecting rotational speed passes through the space between the tip end face 9 of the permanent magnet 8, and the tip of the protrusion 2a of the sarrations 2 which are opposed to the tip end face 9 of the permanent magnet 8. However, in order to accurately detect rotational speed, it is necessary to make the pitch of the serrations 2 fine, so that the area of the tips of the protrusions 2a, and the cross sectional area of the space is reduced. Therefore when the magnetic flux density of the permanent magnet 8 is increased, the magnetic flux would become saturated in this space, so that there is still a considerable drop in output from the sensor 13.

SUMMARY OF THE INVENTION

The rolling bearing unit with the rotational speed detection unit according to the present invention, is addressed at coping with the above mentioned problems.

An objective of the present invention is to provide a rotational speed detection device comprising a tone wheel and a sensor for use in a rolling unit comprising a rotating ring for supporting the tone wheel which is rotated with the rotating ring, and a fixed ring provided coaxial with the rotating ring for supporting the sensor to be faced to the one wheel, the tone wheel having a portion opposed to the sensor where first and second portions having different magnetic properties are alternatively positioned with a same pitch in a circumferential direction, and the sensor having a pair of permanent magnets, yoke of magnetic material disposed between the permanent magnets and having a mid portion, and a coil wound around the mid portion of the yoke, the yoke having opposite ends formed with first and second opposing faces opposed to the tone wheel, respectively, the first and second opposing faces arranged with a first pitch, the first and second portions adjacent the first and second opposing faces having a second pitch, the first pitch being odd number e.g. three times the second pitch, and the pair of permanent magnets having first and second poles with the first poles of the permanent magnets opposed to each other.

Another objective of the present invention it to provide a rolling bearing unit with a rotational speed detection device comprising: a rotating ring with a raceway surface for supporting a tone wheel which is rotated with the rotating ring, a fixed ring with a raceway surface for supporting a sensor to be faced to the tone wheel, a plurality of rolling members provided between the raceway surface of the fixed ring and the raceway surface of the rotating ring, the tone wheel made of a magnetic metal plate, formed in a crank shape in cross section, having a first annular detecting part and a second cylindrical detecting part, and the sensor having magnetic opposing portions which are adapted to be simultaneously opposed to the first and second detecting parts of the tone wheel, a permanent magnet for flowing magnetic flux to the first and second detecting parts, and a detection section for detecting the density of magnetic flux flowing through the opposing portions.

BRIEF DESCRIPTION OF THE INVENTION

FIG. 15(*a*) and FIG. 15(*b*) are a partial, cross sectional view showing a relationship between the sensor and the tone wheel, wherein the electromotive force is induced in the opposite directions.

Figure 16:
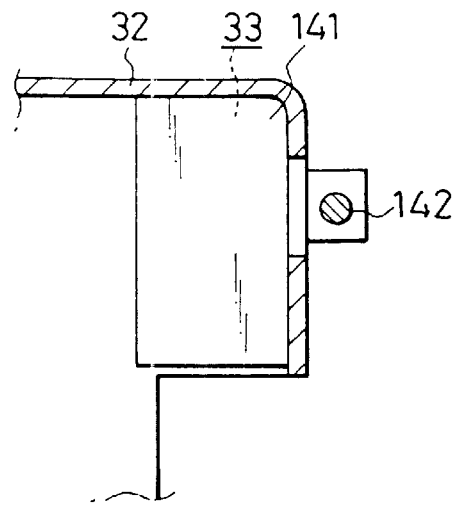

FIG. 16 is a partial, cross sectional view of the sensor having a lead portion to output a signal.

Figure 17:
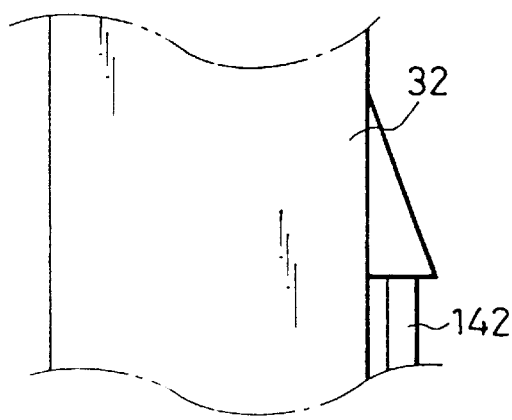

FIG. 17 is a plan view of the sensor of FIG. 16.

Figure 18:
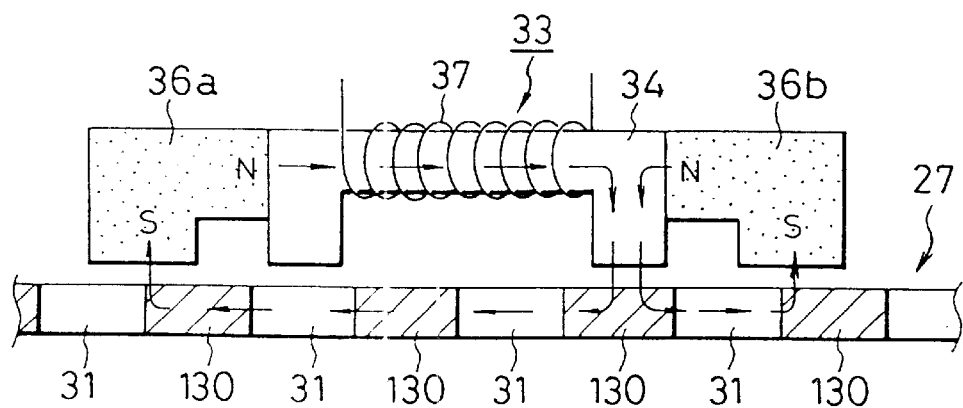

FIG. 18 is a partial, cross sectional view showing a relationship between the sensor and the tone wheel in another embodiment.

Figure 19:
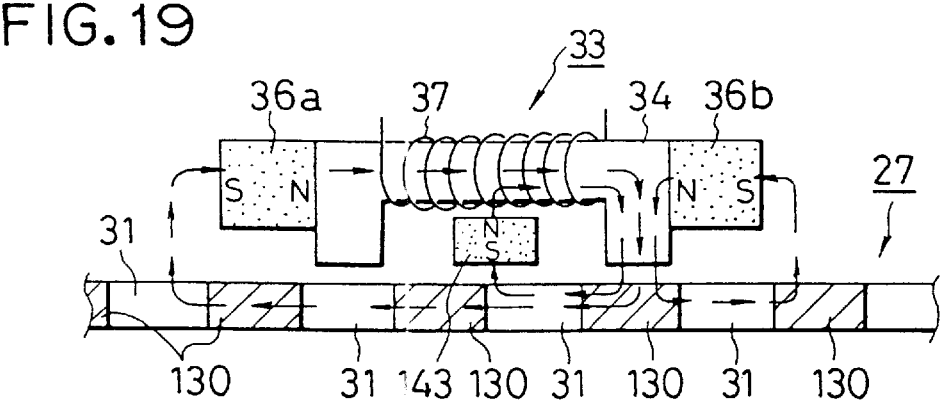

FIG. 19 is a partial, cross sectional view showing a relationship between the sensor and the tone wheel in another embodiment.

Figure 20:
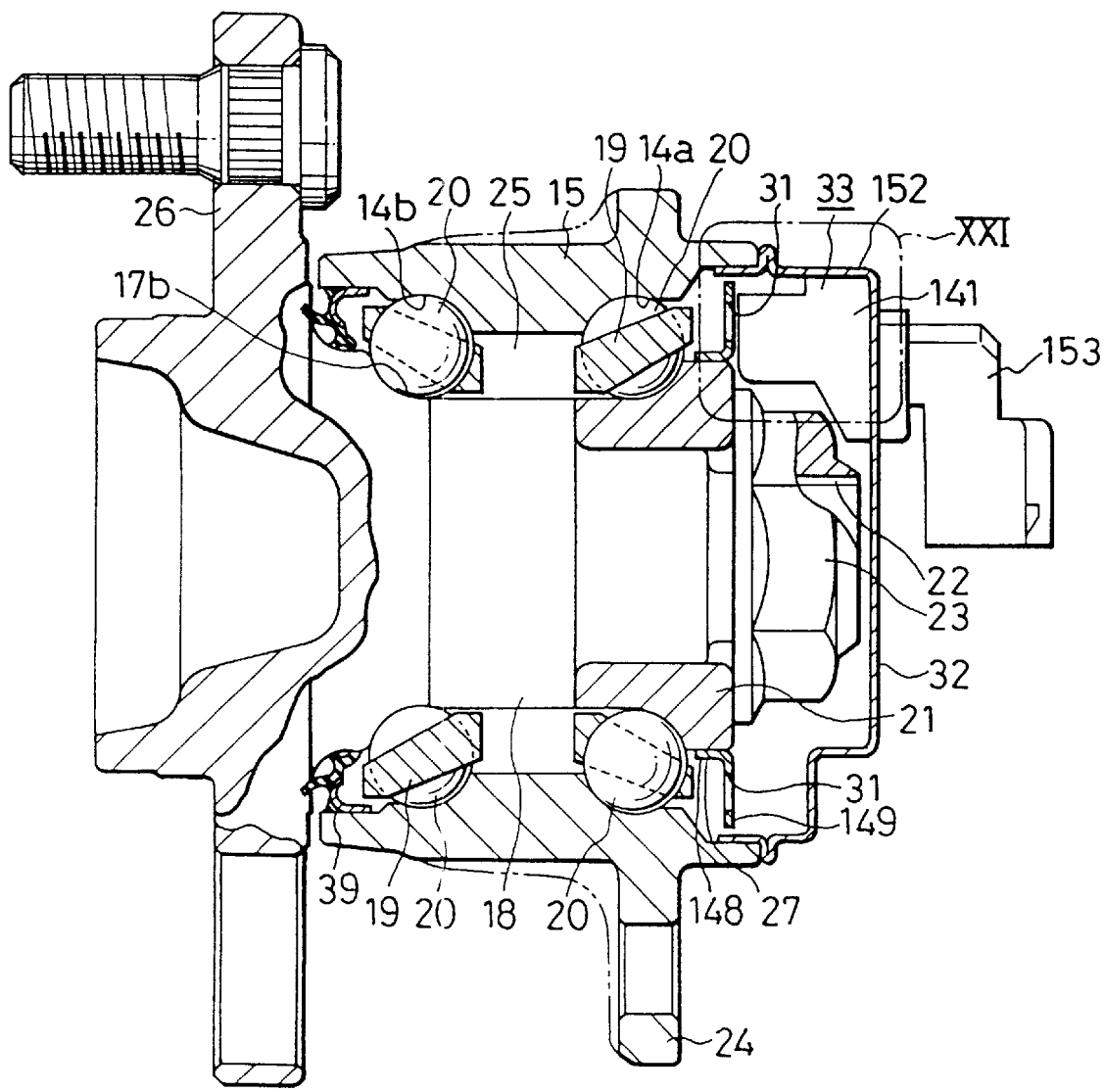

FIG. 20 is a cross sectional view of a rolling bearing unit having a speed detection device in another embodiment according to the present invention.

Figure 21:
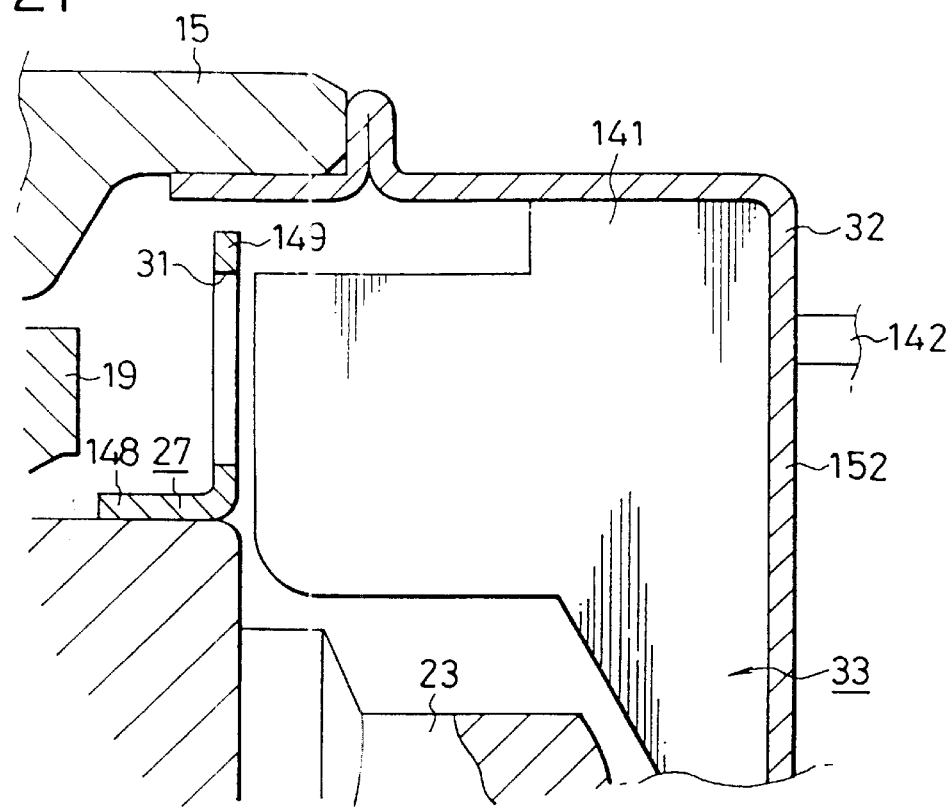

FIG. 21 is an enlarge view of the encircled portion XXI in FIG. 20.

FIG. 22(*a*) and FIG. 22(*b*) ae a partial side view of the tone wheel to show different shapes of the through-holes.

DESCRIPTION OF THE PREFERRED EMBODIMENTS

The rolling bearing unit to which the present invention is applied, as with the previously mentioned conventional earing unit, comprises a fixed ring which does not rotate during use, a rotating ring which is provided concentric with the fixed ring to rotate with the vehicle wheel curing use, a first raceway surface forced on a portion of a peripheral face of the fixed ring which is opposed to a peripheral face of the rotating ring, a second raceway surface formed on a portion of a peripheral face of the rotating ring which is opposed to a peripheral face of the fixed ring, a plurality of rolling bodies or member provided between the first and second raceway surfaces, a tone wheel which is supported by and rotated with the rotating ring, and a sensor which is supported by the fixed ring so as to be opposed to tone wheel.

The tone wheel is made of a magnetic metal plate through press forming and formed such that at least the part thereof which is opposed to the sensor has first portions and second portions having different magnetic characteristics from each other, and spaced alternately around the periphery and at an even pitch. The first and second portions correspond to the serrations 2 in FIG. 4.

In one feature of the present invention, the rotatioral speed detection device has a tone wheel which comprises a first detecting part, specifically ring-shaped or annular detectin part, and at least one second detecting part, specifically cylindrical detecting part which extends from a peripheral rim of the ring-shaped or annular first detecting part. Moreover, provided on the first detecting part and the second detecting part respectively are the first portions and second portions with different magnetic characteristics which are formed at the same pitch and with the same phase.

In addition, the sensor comprises at least two opposing portions made of magnetic material which are respectively adapted to be simultaneously opposed to the first portions or second portions of the first and the second detecting parts, respectively, according to rotation of the rotating ring, a permanent magnet arranged in series in relation to the direction of flow of the magnetic field with respect to the opposing portions and the first and second detecting parts, and a detection section for detecting the density of the magnetic flux passing through the opposing portions.

With the rolling bearing unit with the rotational speed detection device of the present embodiment constructed as described above, during operation when the tone wheel rotates together with the vehicle wheel, the density and direction of the magnetic flux passing through the opposing portions change greatly when one of the opposing portions is opposed to the first portions of the first and the second detecting parts while the other of the opposing portions is opposed to the second portions of the first and the second detecting parts and vice versa.

Figure 1:
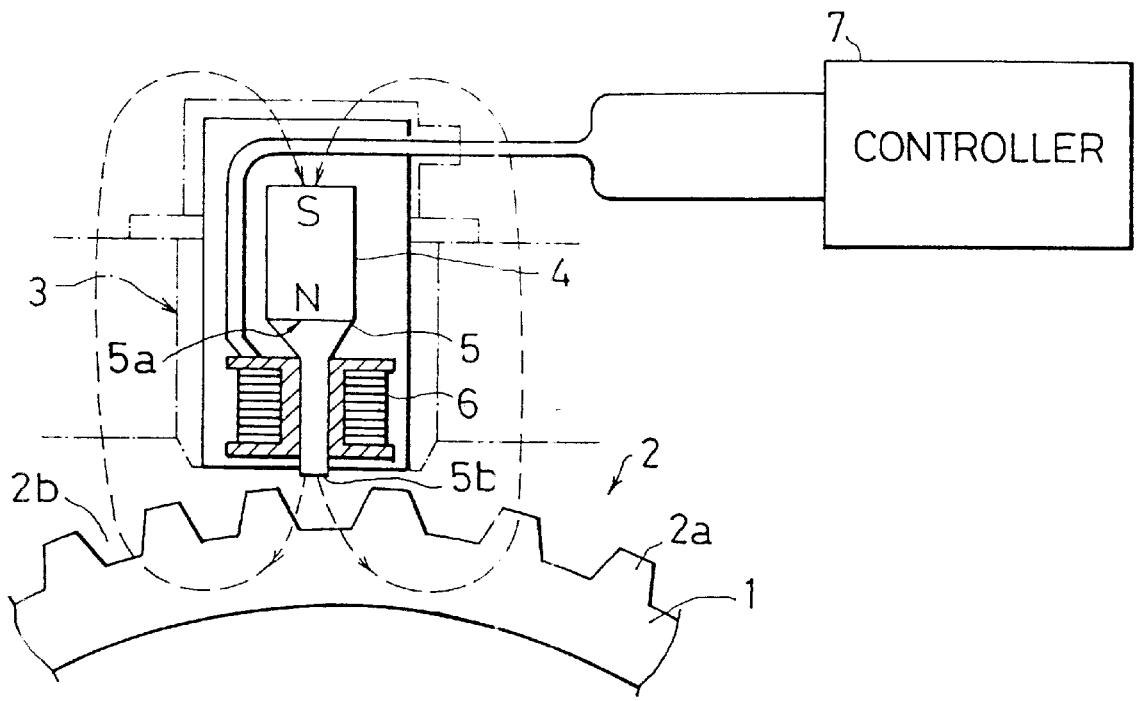
FIG. 1 is a cross sectional view showing an example of a conventional sensor construction in the rolling bearing unit.
Figure 2:
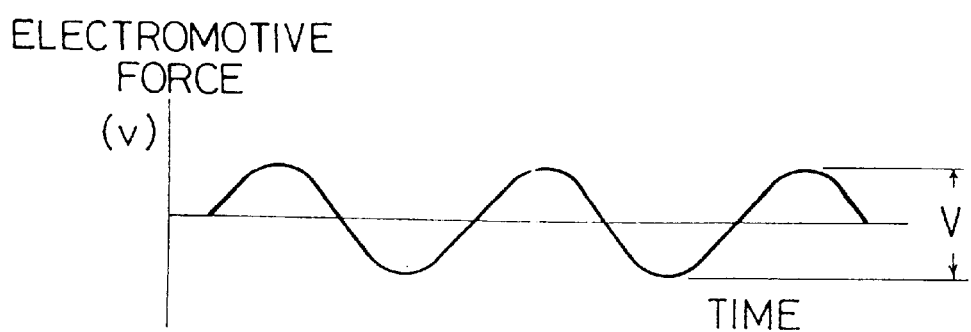
FIG. 2 is a graph showing an output signal of the sensor as in FIG. 1.
Figure 3:
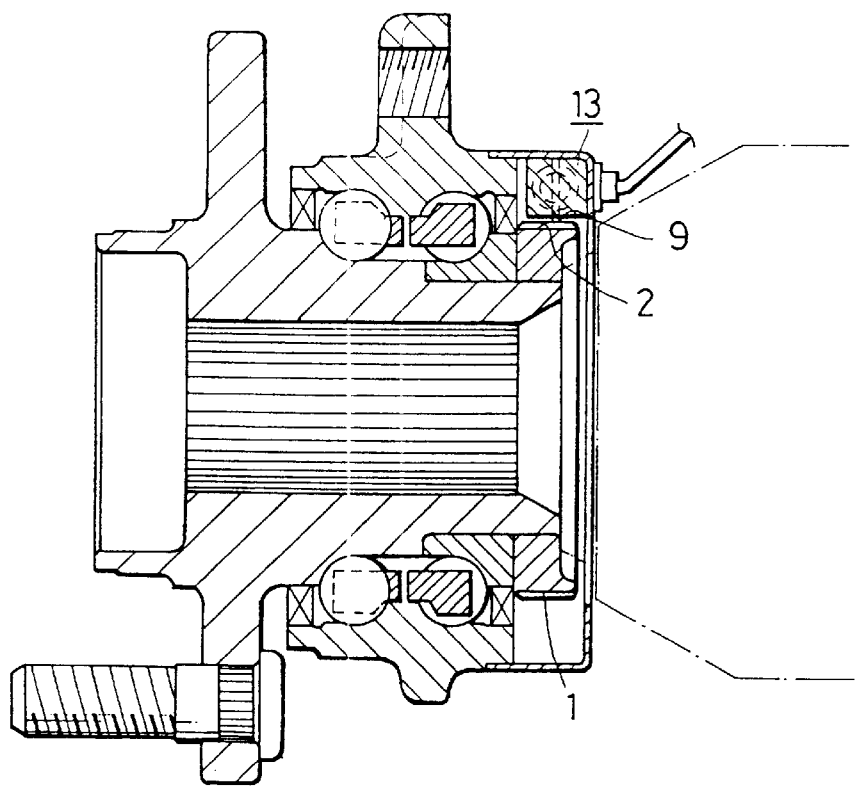
FIG. 3 is a cross sectional view showing another example of a conventional sensor construction in the bearing unit.
Figure 4:
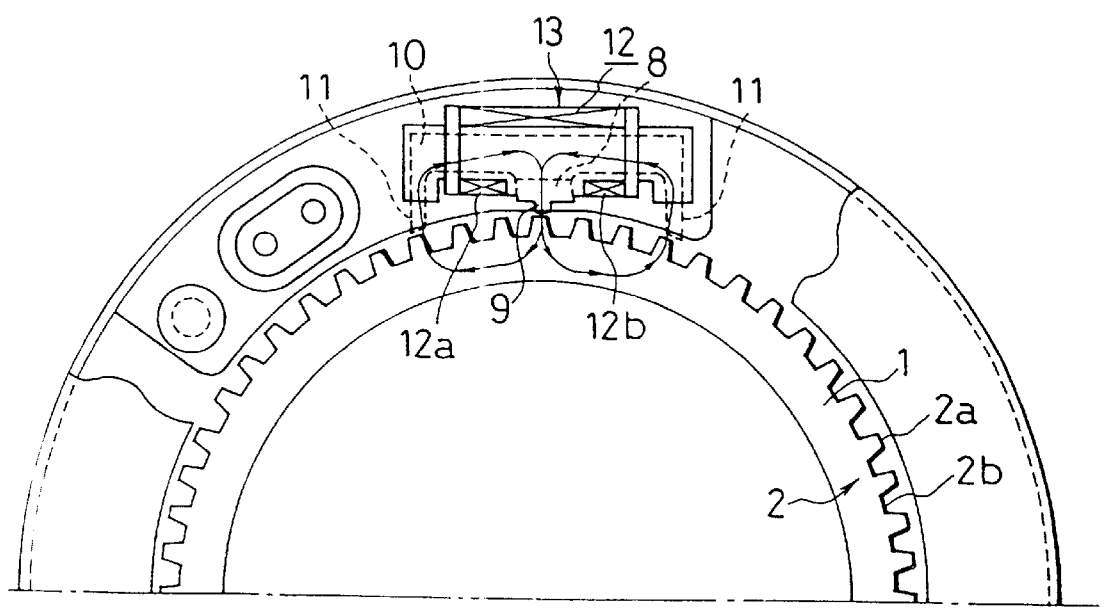
FIG. 4 is an enlarged view of a top half of FIG. 3 viewed from the right hand side (axially inner side)

Since the opposing portions are opposed to the first portions which are formed on both the first and second detecting parts, the cross sectional area of the space between the opposing portions of the sensor and the first portions of the tone wheel can be sufficiently largely maintained (at more than twice that of the space between the tip end 5b and the protrusion 2a of FIG. 1, end between the projection 9 and the protrusion 2a of FIG. 4). Consequently, when one of the opposing portions of the sensor is opposed to the first portions of the tone wheel while the other of the opposing portions of the sensor is opposed to the second portions of the tone wheel and vice versa, the density and direction of the magnetic flux passing through the opposing portions of the sensor change greatly. Accordingly, a sufficiently large amount of variation in the output signal is given from the detection section which detects the density of the magnetic flux passing through the opposing portions of the sensor.

A first embodiment of the present invention is now shown in FIG. 5 through FIG. 8. The rolling boaring unit of this embodiment has a stationary or fixed ring or race 15, and a rotating ring or race 18 located inside the fixed ring or race 15 and having an inner ring 21 which is fitted over an outer peripheral face of an axially inner end portion (the and portion of the center side when assembled on a vehicle; right end portion in FIG. 5) of the rotating ring or race 18. The inner ring 21 is securely fixed onto the rotating ring 18 by tightening a nut 23 onto a threaded portion 22 formed on the axially inner end portion of the rotating ring or race 18.

The fixed ring or race 15 is provided with a first raceway surface comprised of outer ring raceways 14a, 14b in double rows on an inner peripheral face thereof, sod freely supported by a suspension unit (not shown) by means of a flange 24 formed on an outer peripheral face thereof.

The rotating ring or race 18 is provided with a second raceway surface comprised of inner ring raceways 17a, 17b on an outer peripheral face thereof and opposing to the outer ring raceways 14a, 14b. The inner ring raceway 17a provided on the axially inner side (the side toward the center when assembled on a vehicle; the right hand side in FIG. 5) is formed on an outer peripheral surface of the inner ring 21.

Provided between the outer ring raceway 14a, 14b on the fixed ring 15, and the inner ring raceway 17a, 17b on the rotating ring 18, are a plurality of rolling bodies 20 which are retained by retainers 19 respectively so as to rotatably support the rotating ring 18 inside the fixed ring 15.

Figure 5:
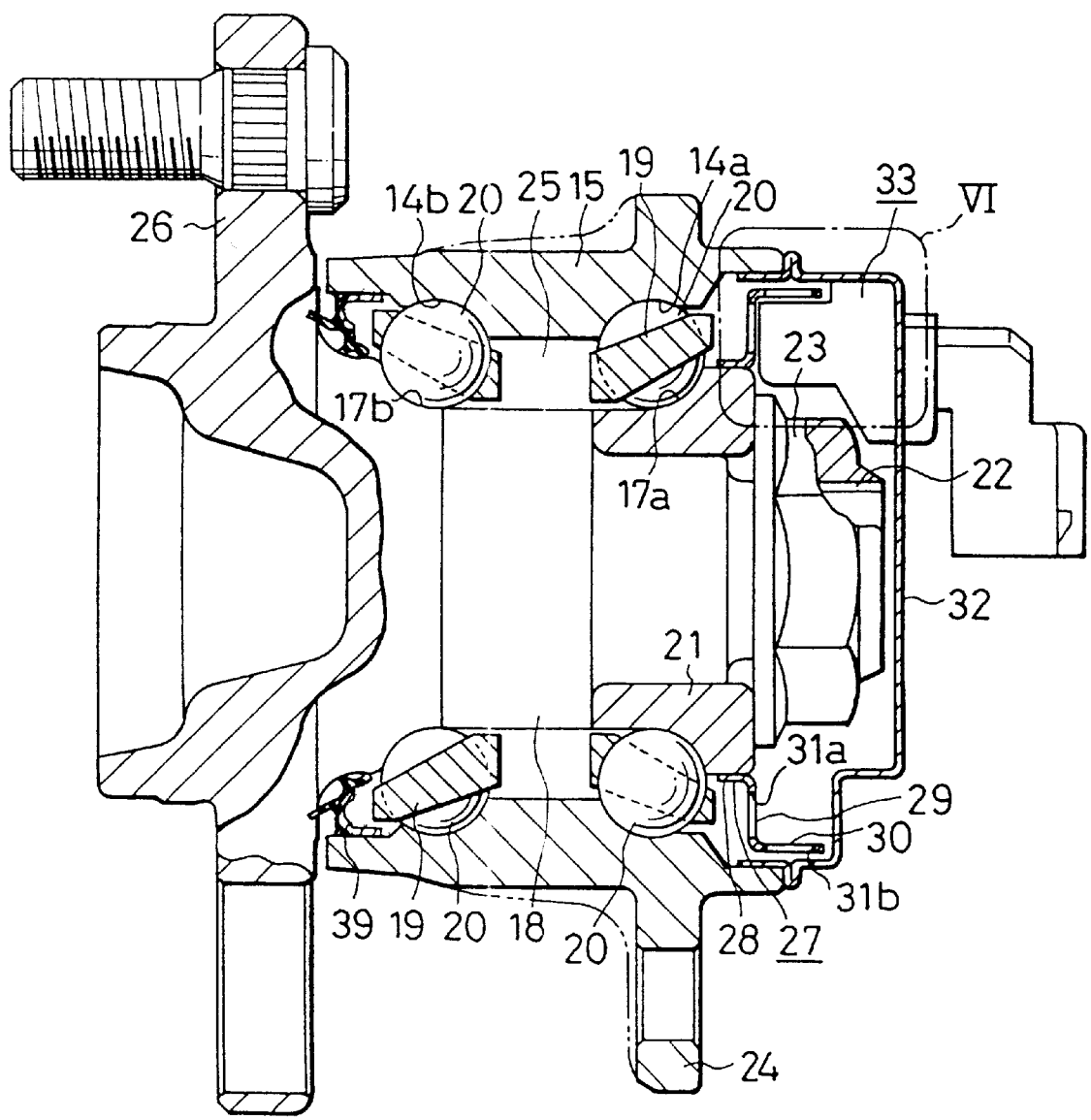
FIG. 5 is a cross sectional view showing a first example of the sensor construction in the bearing unit according to the present invention.
Figure 6:
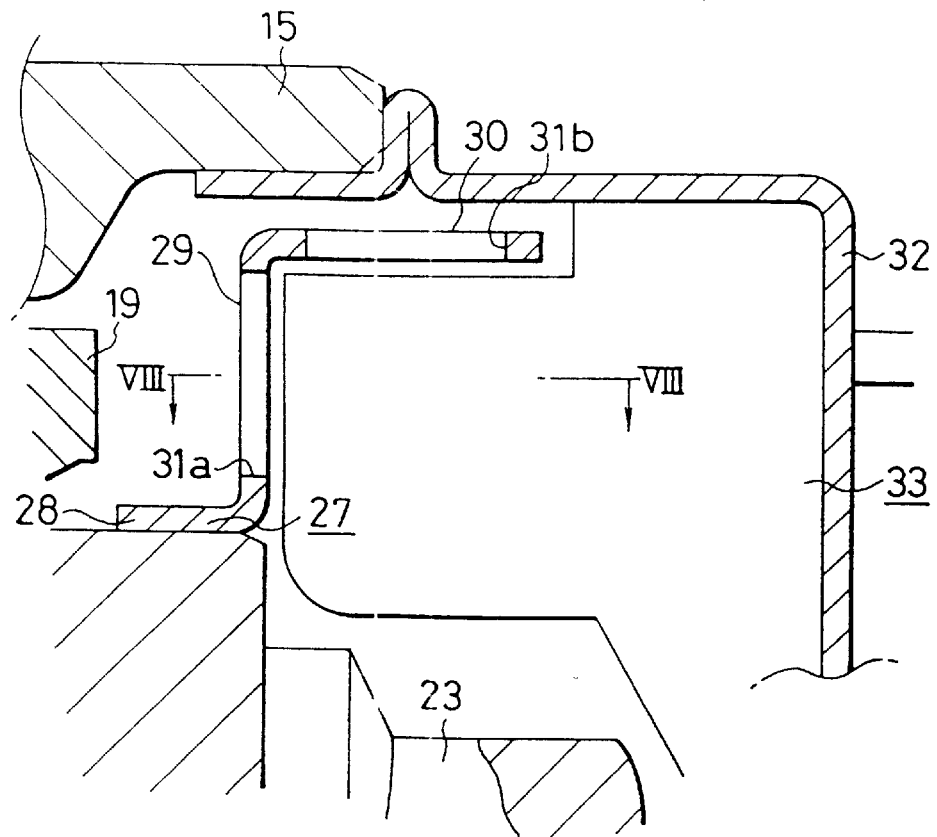
FIG. 6 is an enlarged cross sectional view of part VI of FIG. 5.

A seal ring 39 is fitted between an outer peripheral face of a portion near the axially outer end of the rotating ring or race 18, And an inner peripheral face on an axially outer end portion of the fixed ring or race 15 (here axially outer end refers to the outer side end in the widthwise direction when fitted to a vehicle; the left hand side in FIG. 5). The seal ring 39 covers an open outer end (left hand end in FIG. 5) of a space 25 in which the rolling bodies 20 are located.

Moreover, a flange 26 for attachment of the vehicle wheel, is provided at the axially outer end of the rotating ring 18 on a portion protruding from the axially outer end opening of the fixed ring 15.

With regards to the detection device, a tone wheel or pulser ring 27 is provided at an axially inner end (right hand end in FIG. 5) of the inner ring 21 on a portion displaced away from the inner ring raceway 17a. The tone wheel 27 is made by press-forming a magnetic metal plate, so that the tone wheel 27 is of a generally annular or ring shape in a side view, and of crank shape in cross section. The tone wheel 27 comprises a cylindrical support base 28 secured onto an axially inner and portion of the inner ring 21, a ring-shaped, first detecting part 29 which is bent radially outward from the inner rim of the cylindrical support base 28, sad a cylindrical shaped, second detecting part 30 which extends axially inwards from the outer peripheral rim of the first detecting part 29.

A plurality of rectangular shaped through-holes 31a are formed in the first detecting part 29 while a plurality of rectangular shaped through-holes 31b are formed in the second detecting part 30. These through-holes 31a, 31b are arranged at even spacing in the circumferential direction. The intermediate portions adjoining the through-holes 31a, 31b constitute ferromagnetic first portions while the respective through-holes 31a, 31b constitute non-magnetic second portions. The first portions and the second portions are formed on the first detecting part 29 and the second detecting part 30 with the same pitch and the same phase.

A cover 32 is internally fitted into the opening at the axially inner end (the opening in the right hand end of FIG. 5) of the fixed ring or race 15. This cover 32 is formed by drawing a metal plate and is cylindrical in shape with a base. A sensor 33 which is fixedly mounted to the inside of the cover 32 is positioned so as to be opposed to the axially inner side face of the first detecting part 29, and to the inner peripheral face of the second detecting part 30 with a very small clearance therebetween.

Figure 7:
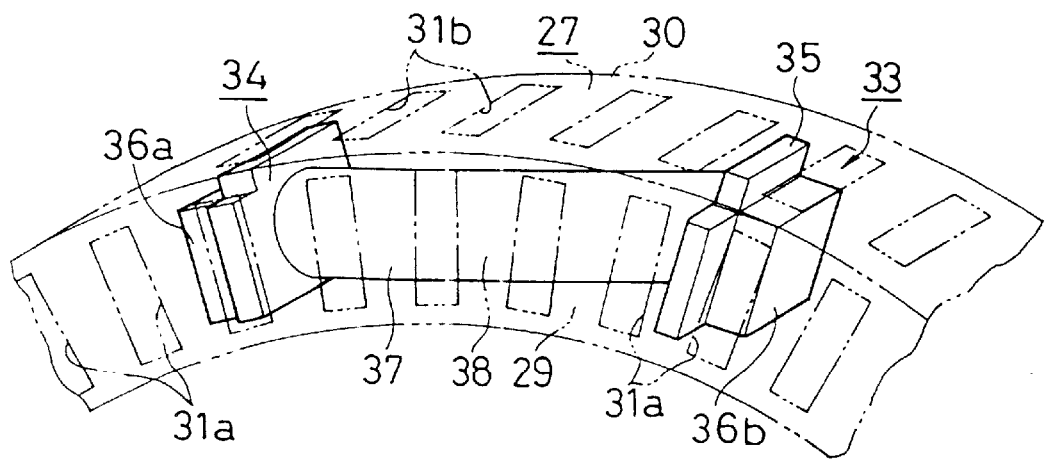
FIG. 7 is a perspective view of a sensor with part of tone wheel illustrated by phantom lines.
Figure 8:
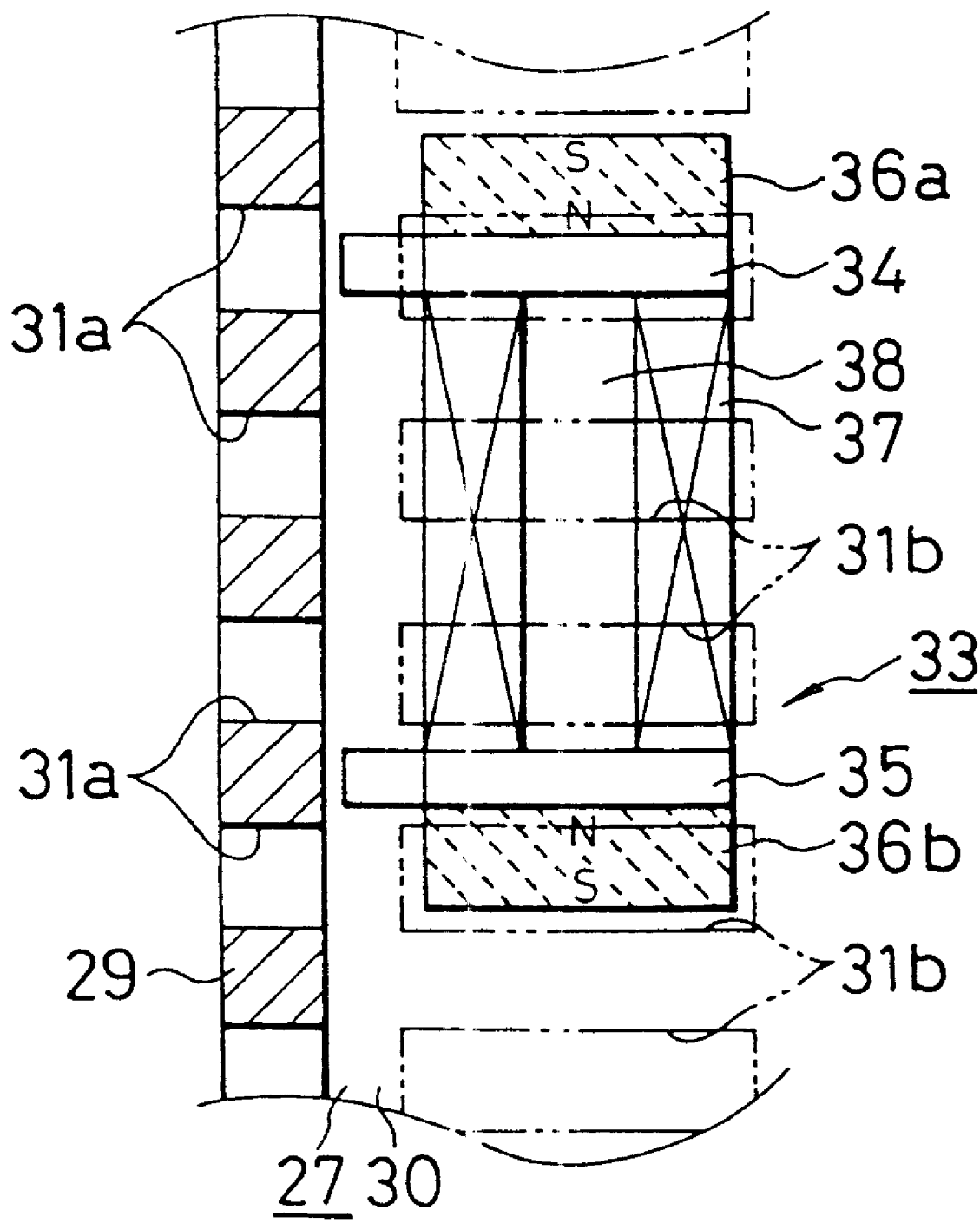
FIG. 8 is a cross sectional view of section VII—VII of FIG. 6 showing the positional relation of a tone wheel and sensor.

The sensor 33 as shown in FIGS. 7 and 8, is made with a first yoke 34 and a second yoke 35, permanent magnets 36a, 36b, and a coil 37, assembled in series in the axial direction of the coil 37 (top-bottom directions in FIG. 8). The first and second yokes 34, 35 constitute the opposing portions, and the coil 37 constitutes the detecting part. The order of assembling is as follows; the coil 37 is positioned in the center, and the permanent magnets 36a, 36b are placed at each and of the sensor 33.

The first yoke 34 and second yoke 35 are each made from magnetic material in flat plate shape. The axially outer end face of the first and second yokes 34, 35 is positioned so as to be opposed to the axially inner side face of the first detecting part 29 with a very small clearance therebetween, and the respective upper end face of the first and second yokes 34, 35 is positioned so as to be opposed to the inner peripheral face of the second detecting part 30 with a very small clearance therebetween. Therefore as the tone wheel 27 rotates, these end faces are alternately opposed to the through-holes 31a, 31b or the intermediate portions adjourning the through-holes 31a, 31b, formed on the first and send detecting parts 29, 30.

The permanent magnets 36a, 36b are positioned in the axial direction of the coil 37 so that their regencies fields are in the opposite directions. Moreover, the coil 37 is wound around an iron core 38 which spans between the first and second yokes 34 35, so that an output signal in produced according to the amount of variation of the magnetic flux flowing inside the iron core 38. The magnitude (voltage) of the output signal produced varies according to the rotation of the rotating ring 18. And, the frequency of the output signal is proportional to the rotating speed of the rotating ring 18. Therefore if the output signal is sent to a controller (not shown in the figure), the rotational speed of the vehicle wheel which rotates with the rotating ring 18 can be determined.

In this case, at the moment when the first yoke 34 which constitutes a first opposing portion, is faced to one of the through-holes 31a formed in the first detecting parts 29 and simultaneously to one of the through-holes 31b formed in the second detecting parts 30, the second yoke 35 which constitutes a second opposing portion is faced to one of the intermediate portions provided between the through-holes 31a and simultaneously to one of the intermediate portions between the through-holes 31b and vice versa. As a result the cross-sectional area of the space between the first and second yokes 34, 35 and the intermediate portions (first portions) can be sufficiently largely maintained. Consequently, between the instant in time when the first yoke 34 is opposed to the through-holes 31a, 31b with the second yoke 35 opposed to the intermediate portions, and the instant that they are opposed to the through-holes 31a, 31b and to the intermediate portions in the contrary manner, the density and direction of the magnetic flux passing through the first and second yokes 34, 35 change greatly. As a result, the amount of variation of the output signal from the coil 37 can be made sufficiently large.

It will be clear, with the embodiment illustrated in FIG. 7 and 8, that at the instant in time that the first yoke 34 is opposed to the through-holes 31a, 31b, the yoke 35 is opposed to the intermediate portions, so that they are placed in opposite phase to each other. Moreover the magnetic field directions of the permanent magnets 36a, 36b are set in the opposite directions. Consequently, a magnetic flux flows alternately in the opposite directions in the iron core 38 in accordance with the rotation of the tone wheel 27. As a result, the amount of variation of the output signal can be made even larger.

Figure 9:
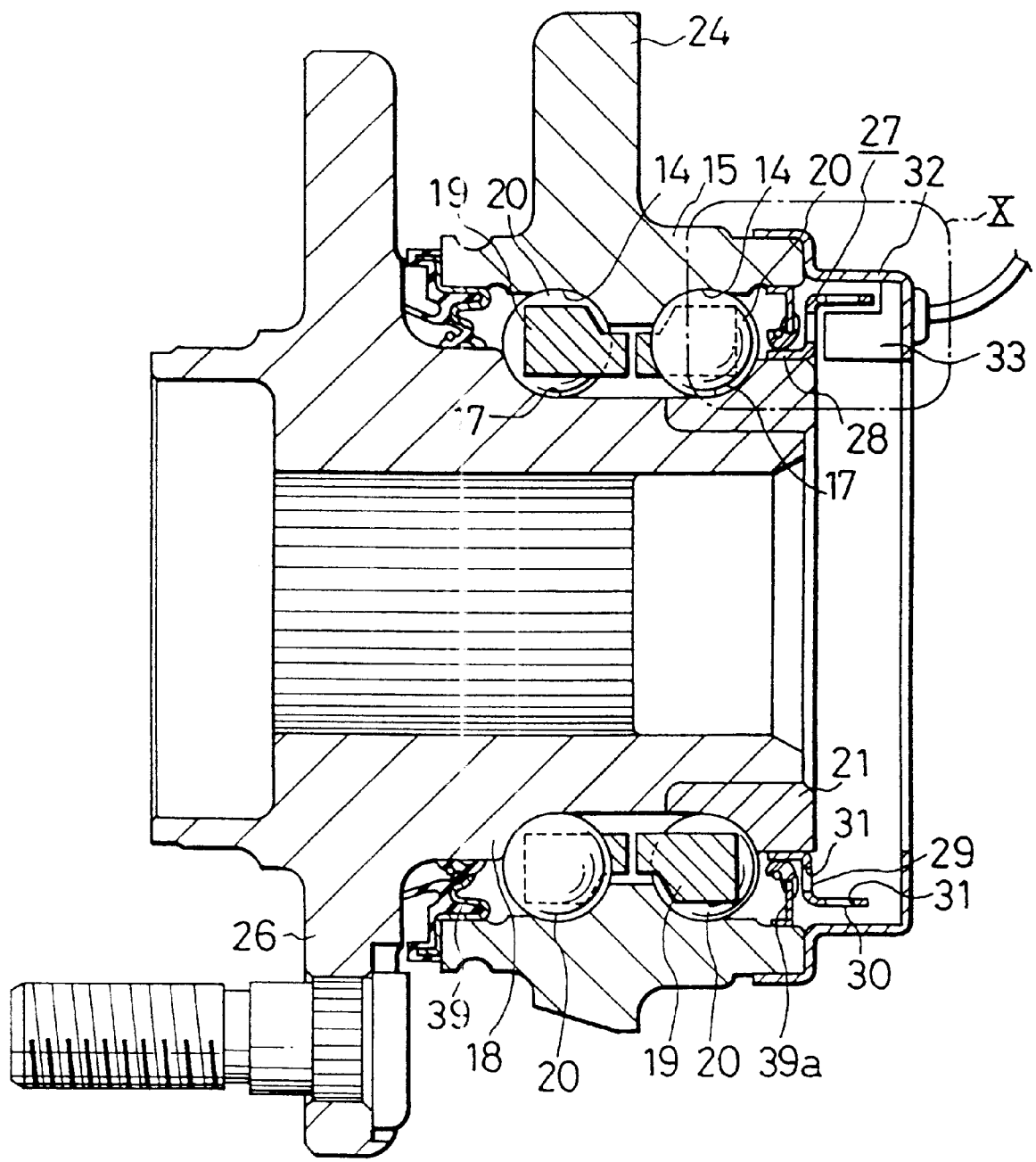
FIG. 9 is a cross sectional view showing another example of the present inventor.
Figure 10:
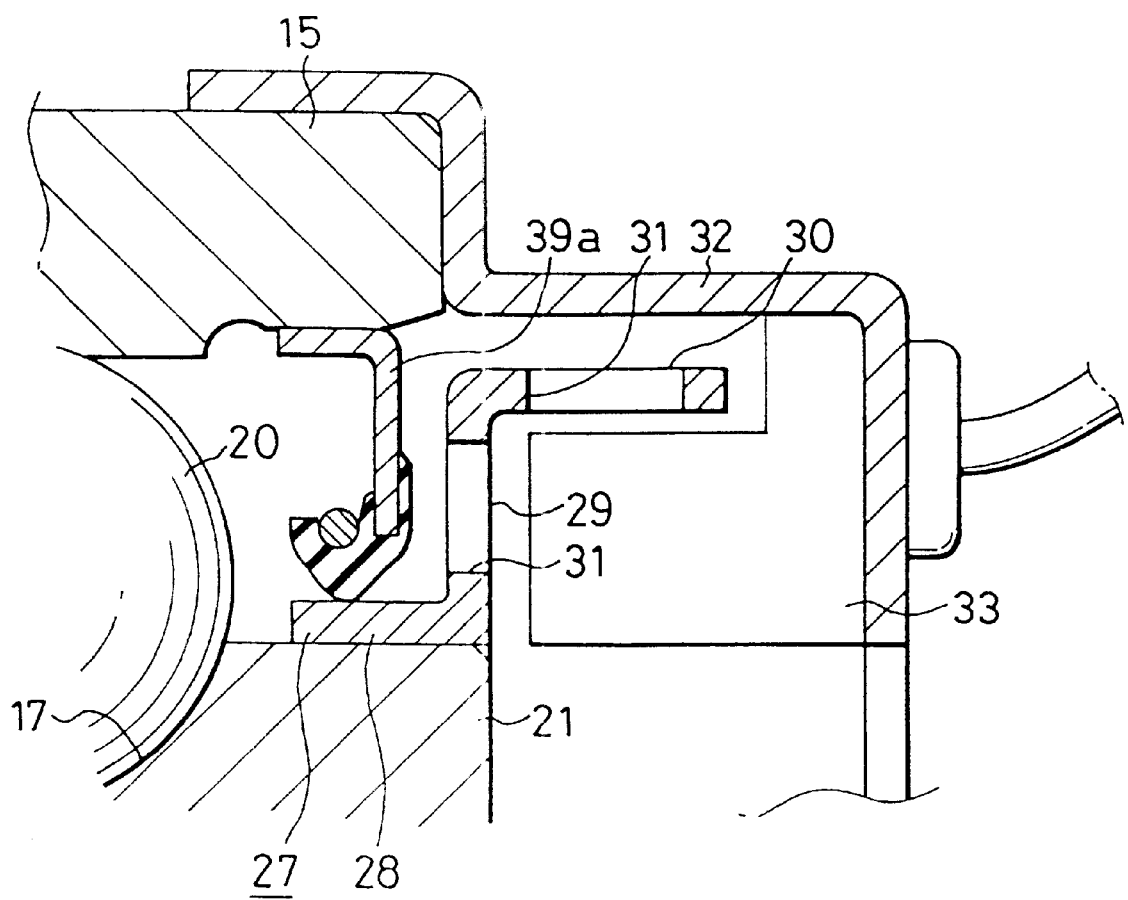
FIG. 10 is an enlarged cross sectional view of part X of FIG. 9.

FIGS. 9 and 10 show another embodiment according to the present invention. In the before mentioned construction shown in FIG. 5, the present invention is applied to a rolling bearing unit for supporting a non-driving or free wheel (front wheel of a front-engine, rear-wheal-drive type, or rear wheel of a front-engine, front-wheel-drive type), while in this embodiment the present invention is applied to a driving wheel (rear wheel of a front-engine, rear-wheel-drive type, or front wheel of a front-wheel-engine, front-drive type). Therefore with this embodiment, a rotating ring 18 is formed in a hollow cylindrical shape with splines formed on an inner peripheral surface thereof. Moreover an annular or ring shaped cover 32 is fixed over an opening section at an axially inner end of a fixed ring 15, and a sensor33 is supported on a portion of the cover 32. In addition to the seal ring 39 at the axially outer end of the fixed ring 15, a seal ring 39a is fitted into an axially inner end of the fixed ring 15. Other details of the construction and operation are substantially the same as for the above mentioned first embodiment.

FIG. 11 to FIG. 15 show another embodiment of the rotating speed detection device according to the present invention, which is incorporated in a rolling bearing unit for supporting driving wheel such as the rear wheel in the front-engine, rear-wheel-drive type, or the front wheel in the front-engine, front-wheel-drive type. In this feature of the rotational speed detection device, the tone wheel has a single detecting part which is formed with the first portions and the second portions with different magnetic characteristics.

The bearing unit has a fixed ring 15 which has on its inner peripheral surface a pair of outer raceways 14a, 14b in double rows. The fixed ring 15 is formed with a flange 24 on its outer peripheral surface and supported by the suspension apparatus through the flangs 24.

Provided on the radially inner side of the fixed ring 15 is a rotating ring 18 which is formed on its outer peripheral surface inner raceways 17a, 17b opposed to the outer raceways 14a, 14b. A plurality of rolling members 20 are provided between the outer raceways 14a, 14b of the fixed ring 15 and the inner raceways 17a, 17b of the rotating ring 18 and retained by a retainer or cage 19 in each row.

Thus, the rotating ring 18 is rotatably supported inside the faced ring 15.

A seal assembly 39a is provided between the outer peripheral surface of the rotating ring 18 at its axially inner end (right end in FIG. 11) and the inner peripheral surface of the fixed ring 15 to close the opening at the axially inner end of the space 25 where the rolling members 20 are positioned.

The seal assembly 39a comprises an inner seal ring 123 fitted into the shoulder portion of the inner ring 21 of the rotating ring 18, and an outer seal ring 124 fitted into the inner end of the fixed ring 15. Another seal ring 39 is provided to close the opening at the axially outer end (left end in FIG. 11) of the space 25.

The inner seal ring 39a comprises a core metal 127 and a seal member 128.

Figure 13:
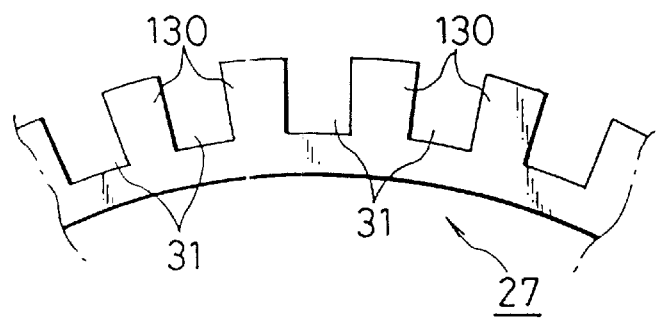
FIG. 13 is a side elevational view of part of a tone wheel.
Figure 14:
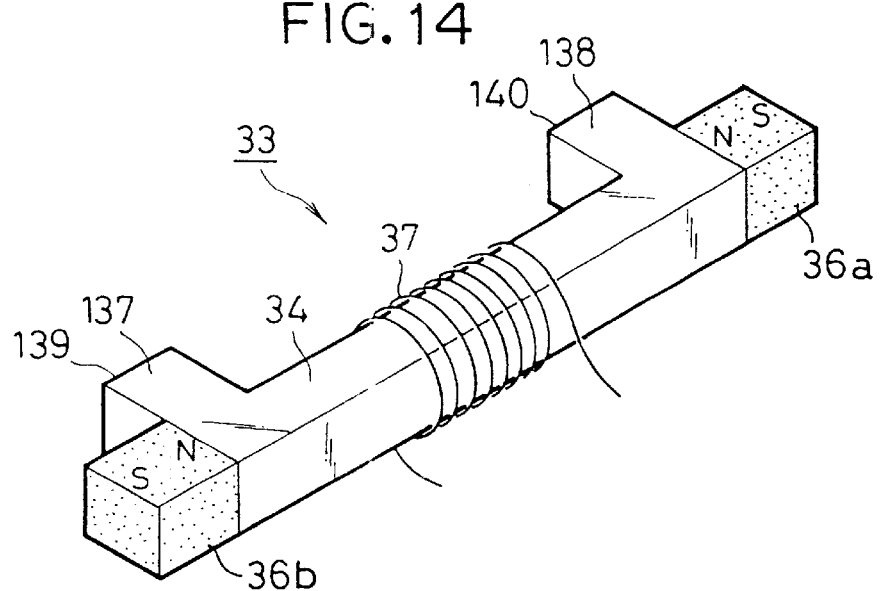
FIG. 14 is a perspective view of a sensor.

Provided on the axially inside (right side in FIGS. 11 and 12) is a tone wheel 27 which is formed from a magnetic plate e.g. by punching-press and in a gear shape as shown in FIG. 13. Specifically, the tone wheel 27 is formed on its outer periphery with a plurality of ferromagnetic tongue portions (first portions) 130 and non-magnetic cutouts (second portions) 31 which are alternatively positioned at the same pitch in a circumferential direction.

Fitted onto the axially inner end opening (right end opening in FIG. 11) of the fixed ring 15 is a generally annular cover 32 which is formed in a L-shape in cross section.

Supported inside the cover 32 is a sensor 33 which is opposed to the axially inner surface of the tone wheel with a minute clearance between them.

The sensor 33 comprises a yoke 34 of magnetic material, a coil 37 wound around the mid portion of the yoke 34, and a pair of permanent magnets 36a, 36b provide on either side of the yoke 34 to support the yoke 34.

A first bent portion 137 is provided at one end of the yoke 34 and bent at right angles with reference to the main body of the yoke 34, while a second bent portion 138 is provided on the other end of the yoke 34 and is bent in the same direction to the first bent portion 137. The tip end face of the first bent portion 137 is a first opposing face 139 while the tip end face of the second bent portion 138 is a second opposing face 140. It will be noted that the yoke 34 has first and second opposing portions 139 and 140.

The first and second opposing faces 139 and 140 are opposed to the axially inner face of the tone wheel 27 with a minute clearance (e.g. about 0.5 mm to about 1 mm) between them.

The pitch P of the first and second opposing faces 139 and 140 in odd number times (specifically three times, five times, seven times . . . ) the pitch p of the tongue portions (first portions) 130 and the cutouts (second portions) 31. In this embodiment, the pitch P is three times the pitch p.

Figure 15A:
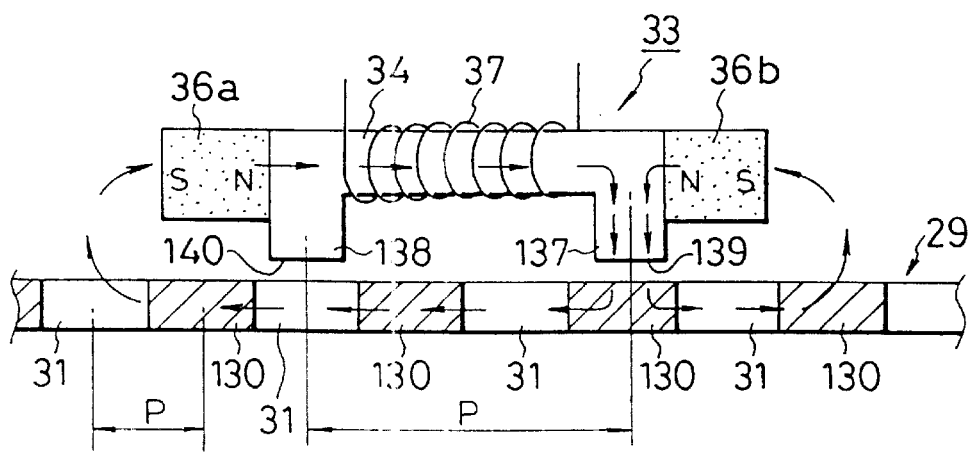
Figure 15B:
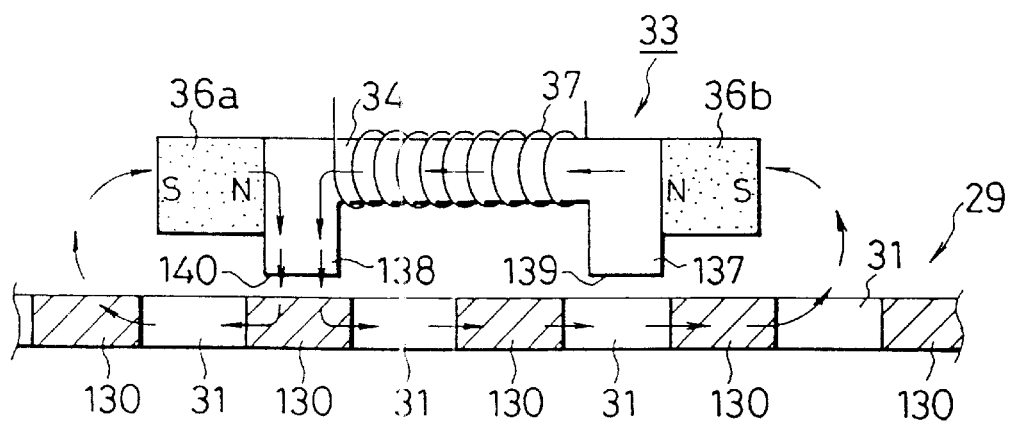

Accordingly, as shown in FIG. 15(a) and FIG. 15(b), at the ant when either of the opposing faces 139 and 140 is opposed to one of the tongue portions 130, the other of the opposing faces 139 and 140 is opposed to one of the cutouts 131.

In addition, the pair of permanent magnets 36a, 36b are respectively abutted to the either in face of the yoke 34, specifically to the outside face of the bent portions 138 and 137, with the same pole (N pole in the drawing) faced to each other.

Thus, by regulating the pitches P and p, and the magnetizing directions of the permanent magnets 36a, 36b, the magnetic flux flows in the opposite directions in the yoke 34 as the tone wheel 27 rotates.

When the first opposing face 139 is faced to one of the tongue portions 130 while the second opposing face 140 is faced to one of the cutouts 31 as shown in FIG. 15(a), the magnetic fluxes out of the N poles of the permanent magnets 36a, 36b flow in a direction from the first opposing face 139 to the tongue portion 130. Consequently, the mid portion of the yoke 34 experiences the magnetic fluxes in the direction from left to right as shown by arrows in FIG. 15(a).

On the contrary, when the second opposing face 140 is faced to one of the tongue portion 130 while the first opposing face 139 is faced to one of the cutouts 31, as shown in FIG. 15(b), the fluxes out of the N poles of the permanent magnets 36b, 36b flow in the direction from the second opposing face 140 to the tongue portion 130. Consequently, the mid portion of the yoke 34 experiences the magnetic fluxes in the direction from right to left as shown by arrows in FIG. 15(b).

The yoke 34, coil 37 and permanent magnets 36a, 36b are assembled as mentioned above and molded in a synthetic resin body 141, thereby forming the sensor 33.

The sensor 33 is supported within the cover 32, and can be extended long in the circumferential direction of the tone wheel 27 where the installation space for the sensor 33 is easily available. Accordingly, the design to incorporate the sensor 33 in the bearing unit is made easier than in the prior art construction.

Using the rotational speed detection device incorporated in the rolling bearing unit according to the present invention, the rotating speed of the vehicle wheel is detected as follows;

As the tone wheel 27 mounted to the rotating ring 18 is rotated with the vehicle wheel mounted to the rotating ring 18, an electromotive force is induced in the coil 37 wound around the mid portion of the yoke 34, while the magnetic fluxes flow alternatively in the opposite directions through the mid portion of the yoke 34. Accordingly, the electromotive force induced in the coil changes its directions alternatively.

Consequently, the yoke 34 is hardly saturated with the magnetic fluxes. In addition, due to electromotive force induced in the opposite directions alternatively, the difference between the maximum voltage and the minimum voltage is enlarged, so that the output in the sensor 33 is sufficiently large, thus improving the precision in the detection of rotating speed in the vehicle wheel.

Incidentally, when the permanent magnets 36a, 36b are positioned so that the S poles are opposed to each other, substantially the same resulting effects are obtained although the magnetic fluxes flow in the contrary direction.

It should be noted that although the permanent magnets 36a, 36b are desirably abutted to the yoke 34 as in the embodiment as mentioned above, the permanent magnets 36a, 36b can be separated from but placed close to the yoke 34 so long as the magnetic fluxes flow through them, this obtaining practically sufficient performance.

Figure 11:
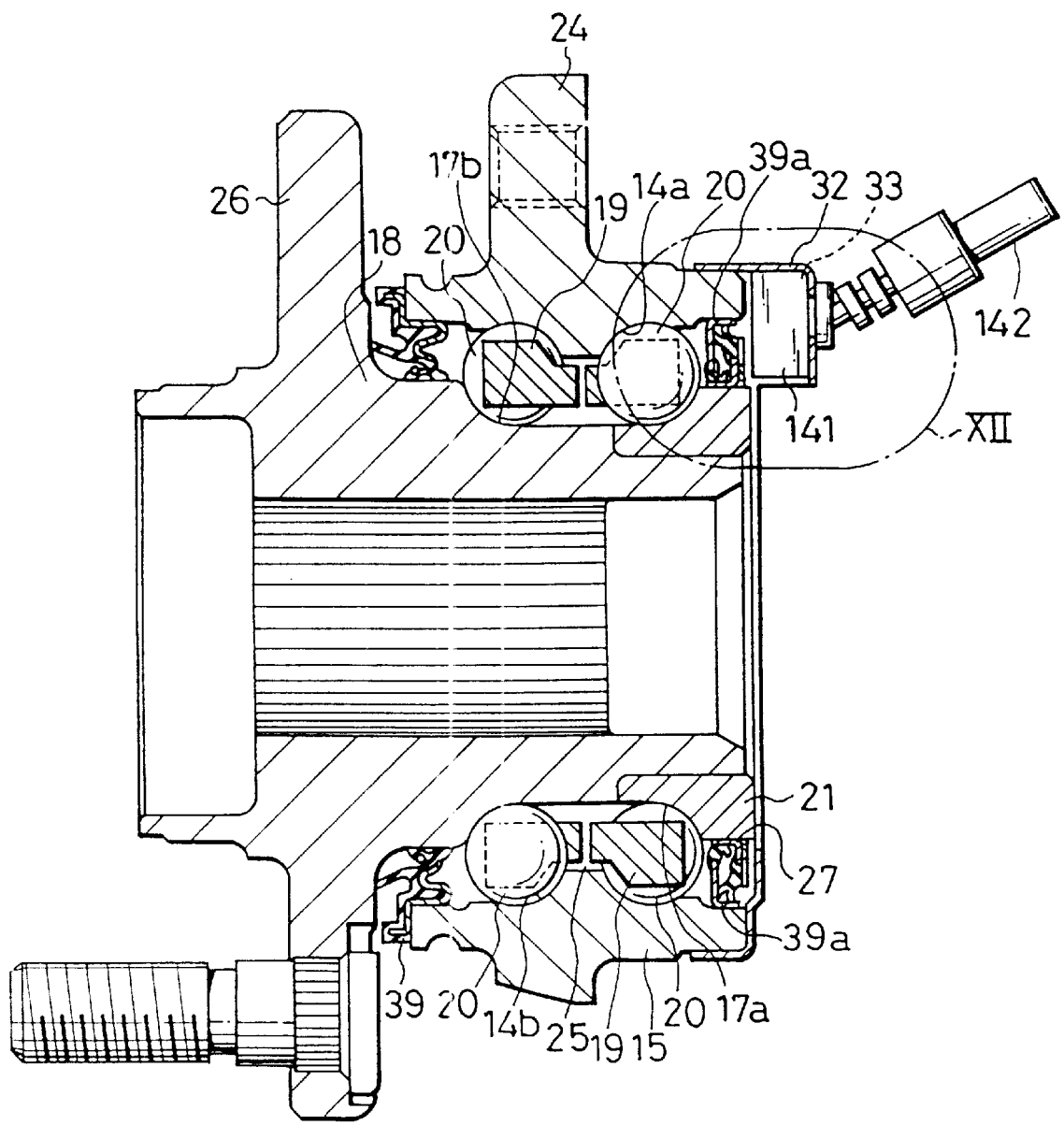
FIG. 11 is a cross sectional view of a rolling bearing unit having a speed detection device in another embodiment according to the present invention.
Figure 12:
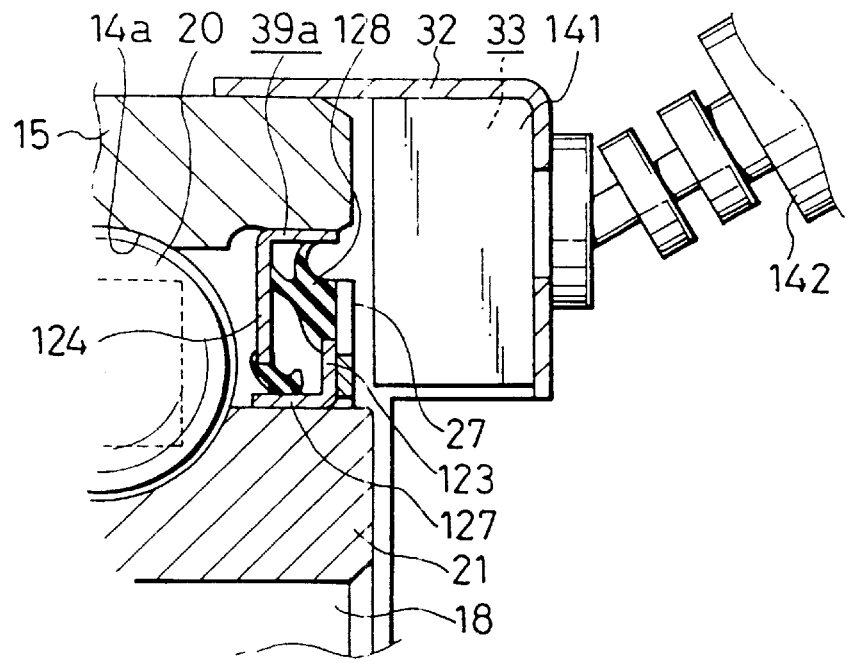
FIG. 12 is an enlarged view of the portion XII in FIG. 11.

An electric lead 142 axially connected to the sensor 33 for outputting in FIG. 11 may be extended in a circumferential direction as shown in FIG. 16 and FIG. 17 when installed e.g. in the front wheel of the front-engine, front-wheel-drive type automobile so as to avoid the interference between the electric lead 142 and the constant velocity joint.

FIG. 18 shows another embodiment of the present invention, where the permanent magnets 36a, 36b abutted to the opposite sides of the yoke 34 are formed in a L-shape, respectively.

The abutting face of the permanent magnet 36a, 36b to the yoke 34 forms one of the N ard S poles (N pole in FIG. 18), and the opposing face to the tone wheel 27 forms the other of the N end S poles (S pole in FIG. 18). In this embodiment, the clearance between the other of the N end S poles in the permanent magnets 36a, 36b and the tone wheel 27 is narrower so that the resistance against the magnetic flux flow is reduced. Consequently, the density of the magnetic flux flowing through the mid portion of the yoke 34 is increased, so that the electromotive force induced in the coil 37 is made larger to improve the output of the sensor 33.

Incidentally, instead of the L-shaped permanent magnets 36a, 36b, an auxiliary yoke is added to the outer side face of the permanent magnets 36a, 36b as in the embodiment in FIG. 15(a) and FIG. 15(b) remote from the yoke 34, so that the end face of the auxiliary yoke is positioned closer to the tone wheel 27.

FIG. 19 shows another embodiment of the present invention, where a third permanent magnet 143 in positioned so as to be faced to the inside face of the mid portion of the yoke 34 closer to the tons wheel 27. The pole of the third permanent magnet 143 faced to the inside face of the yoke 34 is the same to the poles of the permanent magnets 36a, 36b abutted to the opposite ends of the yoke 34.

In the yoke 34 with the third permanent magnet 143 provided, the magnetic flux from the third permanent magnet 143 flows in addition to the magnetic fluxes from the permanent magnets 36a, 36b. Therefore, the density of the magnetic flux flowing through the mid portion of the yoke 34 is increased and the electromotive force induced in the coil 37 around the mid portion is intensified.

FIG. 20 and FIG. 21 show another embodiment of the present invention, where the rotational speed sensor is incorporated in the rolling bearing unit to support a free wheel specifically the front wheel of the front-engine, rear-wheel-drive automobile, or the rear wheel of the front-engine, front-wheel-drive automobile. The fixed ring 15 having the outer ring raceways 14a, 14b in double rows on its inner peripheral surface is supported through the flange 24 by the suspension apparatus (not shown).

Provided inside the fixed ring 15 is a rotating ring 18 which has inner ring raceways 17a, 17b on its outer peripheral surface opposed to the outer ring raceways 14a, 14b.

The inner ring raceway 17a located axially inside is formed on the outer peripheral surface of the inner ring 21 fitted onto the outer peripheral surface of the rotating ring 18 at its axially inner end.

Formed on the rotating ring 18 at its axially inner end is a male thread portion 22 to which a nut 23 is threaded so as to retain the inner ring 21 fitted on the rotating ring 18.

A plurality of rolling members 20 are provided between the outer ring raceways 14a, 14b of the fixed ring 15 and the inner ring raceways 17a, 17b of the rotating ring 18 and retained by a cage 19 in each row, so that the rotating ring 18 is rotatably supported inside the fixed ring 15.

A seal ring 39 is provided between the outer peripheral surface at the axially outer end of the rotating ring 18 and the inner peripheral surface at the 8 axially outer end of the fixed ring 15 to close the opening at the axially outer end of the space where the rolling members 20 are located. A flange 26 for mounting a wheel is provided at the axially outer end of the rotating ring 18 extending out of the axially outer opening of the fixed ring 15.

A tone wheel 27 is provided at the axially inner end of the inner ring 21 displaced from the inner ring raceway 17a. The tone wheel 27 is made from a magnetic plate by press-forming in a L-shape in cross section and in a generally annular shape.

Figure 22A:
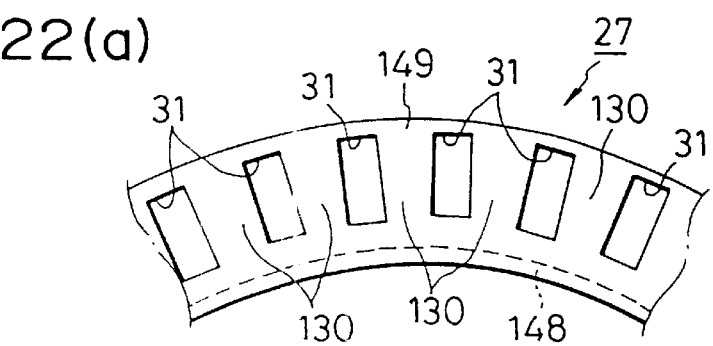
Figure 22B:
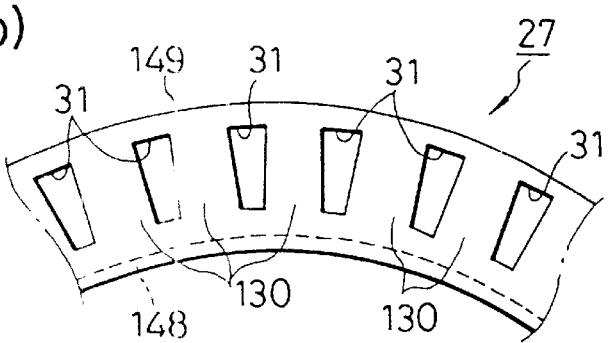

The tone wheel 27 comprises a cylindrical support portion 148 fitted onto the axially inner end of the inner ring 21 and an annular portion 149 radially extending from the axially inner end edge of the cylindrical support portion 148. A plurality of through-holes 31 are formed in the annular portion 149 spaced apart with a uniform distance in the circumferential direction, and have a rectangular shape as shown in FIG. 22(a) or a sector shape as shown in FIG. 22(b).

In the annular portion 149 in this embodiment the through-holes 31 are the non-magnetic (second) portion and the column or intermediate portions 130 between the adjacent through-holes 31 are the ferro-magnetic (first) portion.

The first and second portions, that is the column portions 130 and the through-holes 31 are arranged at the same pitch in the annular portion 149.

A cover 32 is fitted into the axially inner end opening of the fixed ring 15. The cover 32 is made from the metal plate through drawing process so as to have a bottomed cylindrical shape.

The cover 32 has a sector-shaped projection 152 protruding radially outwards (upwards in FIG. 20) so as to support a synthetic resin body 141 with a sensor 33 molded in it. An electric lead 142 or a socket 153 for the lead can be connected to the sensor 33 through the cover 32 and the synthetic resin body 141.

It should be noted that with the rolling bearing unit with the rotational speed detection device of the present invention constructed and operating as described above, an increase in sensor output, as well as accurate detection of wheel rotational speed is possible without an increase in size of the bearing unit.

What is claimed is:

1. A bearing unit to be combined with a vehicle wheel, comprising:

a hub for mounting the vehicle wheel, a stationary outer ring having an inner periphery formed with a double row of outer ring raceways for bearing thereon, and an open end, a pair of rotatable inner rings each having an outer periphery formed with an inner ring raceway for bearing thereon, and fixedly fitted onto the hub, a plurality of rolling members rotatably provided between the outer ring raceways and the inner ring raceways, respectively, a tone wheel made from a magnetic metal plate, fixedly fitted to an end of one of the inner rings, and having an annular ring portion or cylindrical portion defining a detected portion with larger magnetic resistance portions and smaller magnetic resistance portions which are circumferentially alternately arranged with a uniform pitch, a cover fixed to the open end of the stationary outer ring, and a sensor fixed to the cover and comprising a magnetic flux generator having a permanent magnet at either end thereof and a central portion, a voltage generator located at the central portion of the magnetic flux generator and having a coil wound around the magnetic flux generator, and a pair of detecting portions, wherein when one of the detecting portions faces the respective larger magnetic resistance portions in the tone wheel, the other of the detecting portions faces the respective smaller magnetic resistance portions.

2. A bearing unit to be combined with a vehicle wheel, comprising:

a hub for mounting a vehicle wheel, and having an outer periphery formed with an inner ring raceway for bearing thereon, a stationary outer ring having an inner periphery formed with a double row of outer ring raceways for bearing thereon, and an open end, an inner ring having an outer periphery formed with an inner ring raceway for bearing thereon, and fixedly fitted onto the hub, a plurality of rolling members rotatably provided between the outer ring raceways and the inner ring raceways, respectively, a tone wheel made from a magnetic metal plate, fixedly fitted to an end of the inner ring, and having an annular ring portion or cylindrical portion defining a detected portion with larger magnetic resistance portions and smaller magnetic resistance portions which are circumferentially alternately arranged with a uniform pitch, a cover fixed to the open end of the stationary outer ring, and a sensor fixed to the cover and comprising a magnetic flux generator having a permanent magnet at either end thereof and a central portion, a voltage generator located at the central portion of the magnetic flux generator and having a coil wound around the magnetic flux generator, and a pair of detecting portions, wherein when one of the detecting portions faces respective larger magnetic resistance portions in the tone wheel, the other of the detecting portions faces respective smaller magnetic resistance portions.

* * * * *